United States Patent
Miyata et al.

(10) Patent No.: US 10,384,556 B1
(45) Date of Patent: Aug. 20, 2019

(54) MULTI-VEHICLE TYPE DEVICE HAVING BATTERY PACKS

(71) Applicant: Honda Motor Co., Ltd., Tokyo (JP)

(72) Inventors: Hiroki Miyata, Buena Park, CA (US); Nicholas Renner, Irvine, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/918,095

(22) Filed: Mar. 12, 2018

(51) Int. Cl.

| | | |
|---|---|---|
| *B62K 13/00* | (2006.01) | |
| *B60L 11/18* | (2006.01) | |
| *B62K 13/08* | (2006.01) | |
| *B62K 15/00* | (2006.01) | |
| *B62K 21/12* | (2006.01) | |
| *B62L 1/04* | (2006.01) | |
| *B62J 1/00* | (2006.01) | |
| *B62J 25/00* | (2006.01) | |
| *B62J 99/00* | (2009.01) | |

(Continued)

(52) U.S. Cl.
CPC ........ B60L 11/1879 (2013.01); A63C 17/015 (2013.01); A63C 17/12 (2013.01); A63C 17/26 (2013.01); B60L 11/1877 (2013.01); B62J 1/00 (2013.01); B62J 25/00 (2013.01); B62J 99/00 (2013.01); B62K 11/02 (2013.01); B62K 13/08 (2013.01); B62K 15/006 (2013.01); B62K 21/12 (2013.01); B62L 1/04 (2013.01); H01M 2/1077 (2013.01); H01M 10/46 (2013.01); B60L 2200/12 (2013.01); B60L 2200/24 (2013.01); B62J 2099/004 (2013.01); H01M 2220/20 (2013.01); H02J 7/0013 (2013.01); H02J 7/025 (2013.01)

(58) Field of Classification Search
CPC .............. B60L 11/1879; B60L 11/1877; B60L 2200/12; B60L 2200/24; A63C 17/015; A63C 17/12; A63C 17/26; B62K 11/02; B62K 13/0008; B62K 15/00; B62K 15/006; B62K 2015/001; B62K 2208/00; B62K 2202/00; B62K 2204/04; B62K 3/002; H01M 2/1077; H01M 10/46
See application file for complete search history.

(56) References Cited

U.S. PATENT DOCUMENTS

| 2,440,091 | A | * | 4/1948 | Hoyt | ................... | B62K 15/00 |
|---|---|---|---|---|---|---|
| | | | | | | 280/287 |
| 2,746,769 | A | * | 5/1956 | Hoogendoorn | ........ | B62K 15/00 |
| | | | | | | 280/287 |

(Continued)

FOREIGN PATENT DOCUMENTS

| CN | 205680708 U | * | 11/2016 | | |
|---|---|---|---|---|---|
| DE | 102010012171 A1 | * | 9/2011 | ............. | B62K 3/002 |

(Continued)

*Primary Examiner* — James A Shriver, II
*Assistant Examiner* — Steve Clemmons
(74) *Attorney, Agent, or Firm* — Rankin, Hill & Clark LLP

(57) ABSTRACT

A universal electric vehicle frame configured to be exchangeably coupled to a plurality of different types of sets of wheel assemblies to selectively form a plurality of different types of electric vehicles including an electric scooter, an electric skateboard, and an electric bicycle. The universal electric vehicle frame includes an encasement for housing one or more batteries to power the electric vehicles. At least one of the wheel assemblies includes an electric motor powered by the batteries, and configured to turn a wheel of the wheel assemblies.

20 Claims, 6 Drawing Sheets

(51) Int. Cl.
*A63C 17/01* (2006.01)
*A63C 17/12* (2006.01)
*A63C 17/26* (2006.01)
*H01M 2/10* (2006.01)
*H01M 10/46* (2006.01)
*B62K 11/02* (2006.01)
*H02J 7/02* (2016.01)
*H02J 7/00* (2006.01)

(56) References Cited

U.S. PATENT DOCUMENTS

| | | | | |
|---|---|---|---|---|
| 3,437,161 A * | 4/1969 | Ufford | ............. | A63C 17/01 180/11 |
| 4,452,327 A * | 6/1984 | Mowat | ............. | B62K 5/025 180/11 |
| 4,691,930 A * | 9/1987 | Samuel | ............. | B62K 13/00 280/7.1 |
| 5,020,624 A * | 6/1991 | Nesterick | ............. | B62K 5/025 180/208 |
| 5,612,606 A | 3/1997 | Guimarin et al. | | |
| 5,695,021 A * | 12/1997 | Schaffner | ............. | B60G 3/06 180/208 |
| 5,775,452 A | 7/1998 | Patmont | | |
| 5,787,693 A | 8/1998 | Dyke | | |
| 5,893,425 A * | 4/1999 | Finkle | ............. | A63C 17/01 180/180 |
| 6,341,658 B1 * | 1/2002 | Rosenwald | ............. | A63C 17/0013 180/11 |
| 6,435,529 B1 * | 8/2002 | Stewart | ............. | B62K 3/002 188/19 |
| 6,624,610 B1 * | 9/2003 | Ono | ............. | B60K 1/04 320/104 |
| 6,631,913 B2 * | 10/2003 | Godfrey | ............. | A63C 17/01 280/87.041 |
| 6,691,813 B2 * | 2/2004 | Schless | ............. | B62K 11/02 180/220 |
| 6,793,248 B1 * | 9/2004 | Sung | ............. | B62D 21/14 180/208 |
| 6,805,368 B1 * | 10/2004 | Chen | ............. | B62K 3/002 280/87.041 |
| 7,172,205 B1 * | 2/2007 | Vujtech | ............. | A63C 17/004 280/87.021 |
| 7,234,557 B2 * | 6/2007 | Chen | ............. | B62K 5/025 180/208 |
| 7,255,191 B2 | 8/2007 | Baldwin et al. | | |
| 7,375,492 B2 | 5/2008 | Calhoon et al. | | |
| 7,628,413 B2 * | 12/2009 | Gallipoli | ............. | A63C 17/0086 280/786 |
| 7,635,137 B2 * | 12/2009 | Gregory | ............. | A63C 17/0086 280/87.041 |
| 8,251,384 B1 * | 8/2012 | Christensen | ............. | A63C 17/015 280/11.115 |
| 8,316,976 B2 | 11/2012 | Johnson et al. | | |
| 8,317,206 B1 * | 11/2012 | Novitzky | ............. | A63C 17/008 280/87.042 |
| 8,613,457 B2 * | 12/2013 | Wegener | ............. | B62K 3/002 280/87.01 |
| 8,628,099 B2 * | 1/2014 | Gregory | ............. | A63C 17/0086 280/87.041 |
| 8,662,508 B2 * | 3/2014 | Grossman | ............. | A63C 17/26 280/11.203 |
| 8,789,640 B2 | 7/2014 | Matsuda | | |
| 8,801,006 B2 * | 8/2014 | Grossman | ............. | B62K 3/002 280/87.021 |
| 8,864,152 B1 * | 10/2014 | Danze | ............. | B62K 3/002 280/87.041 |
| 9,139,228 B2 * | 9/2015 | Chen | ............. | B62D 21/12 |
| 9,156,342 B2 | 10/2015 | Annaberger et al. | | |
| 9,365,254 B1 * | 6/2016 | Durrett | ............. | B62K 13/08 |
| 9,375,632 B1 * | 6/2016 | Kish | ............. | A63C 17/012 |
| 9,415,296 B1 * | 8/2016 | Miller | ............. | A63C 17/26 |
| 9,434,374 B2 * | 9/2016 | Chan | ............. | B60W 10/196 |
| 9,446,811 B1 * | 9/2016 | Abel | ............. | B62K 7/04 |
| 9,583,745 B2 | 2/2017 | White et al. | | |
| 9,616,294 B2 * | 4/2017 | Kramer | ............. | A63B 21/00058 |
| 9,637,190 B2 | 5/2017 | Pojidaev | | |
| 9,555,679 B2 | 7/2017 | Pezza | | |
| 9,780,585 B2 * | 10/2017 | Chen | ............. | H02J 7/0045 |
| 9,795,864 B1 * | 10/2017 | Bao | ............. | A63C 17/017 |
| 9,808,704 B1 * | 11/2017 | Crossland | ............. | A63C 17/0086 |
| 9,834,275 B2 * | 12/2017 | Montague | ............. | B62K 3/02 |
| 9,878,230 B1 * | 1/2018 | Seele | ............. | A63C 17/26 |
| 9,908,031 B2 * | 3/2018 | Ma | ............. | B62L 1/12 |
| 9,908,032 B2 * | 3/2018 | Garcia Elena | ............. | B62M 6/65 |
| 9,919,761 B2 * | 3/2018 | Adam | ............. | B60L 11/1877 |
| 9,950,243 B2 * | 4/2018 | Evans | ............. | A63C 17/015 |
| 9,950,244 B1 * | 4/2018 | Sargis | ............. | A63C 17/12 |
| 9,963,185 B2 * | 5/2018 | Neugebauer | ............. | B62J 99/00 |
| 10,052,520 B2 * | 8/2018 | Kramer | ............. | A63B 26/003 |
| 2002/0093162 A1 * | 7/2002 | Tai | ............. | B62K 3/002 280/87.041 |
| 2003/0094320 A1 * | 5/2003 | Chernoff | ............. | B60N 2/90 180/54.1 |
| 2003/0168273 A1 | 9/2003 | Ducharme et al. | | |
| 2005/0230929 A1 * | 10/2005 | Chen | ............. | A63C 17/01 280/87.05 |
| 2007/0035101 A1 * | 2/2007 | Gregory | ............. | A63C 17/0086 280/87.042 |
| 2008/0063469 A1 * | 3/2008 | Drew | ............. | B62K 15/00 403/345 |
| 2012/0091955 A1 | 4/2012 | Gao | | |
| 2012/0193884 A1 * | 8/2012 | Scolari | ............. | A63C 17/01 280/87.042 |
| 2014/0129054 A1 | 5/2014 | Huntzicker et al. | | |
| 2014/0196968 A1 * | 7/2014 | Bieler | ............. | B62M 6/65 180/181 |
| 2014/0312582 A1 * | 10/2014 | Scolari | ............. | A63C 17/18 280/7.12 |
| 2015/0137481 A1 * | 5/2015 | Manternach | ............. | B62K 5/007 280/400 |
| 2015/0202526 A1 * | 7/2015 | Rawlins | ............. | A63C 17/017 280/87.042 |
| 2017/0282051 A1 * | 10/2017 | Meyer | ............. | A63C 17/012 |
| 2018/0043965 A1 * | 2/2018 | Baek | ............. | B62K 15/006 |
| 2018/0104567 A1 * | 4/2018 | Treadway | ............. | A63C 17/265 |
| 2018/0111038 A1 * | 4/2018 | Green | ............. | A63C 17/002 |
| 2018/0251182 A1 * | 9/2018 | Chen | ............. | B62K 11/007 |

FOREIGN PATENT DOCUMENTS

| | | | | |
|---|---|---|---|---|
| GB | | 220451 A * | 8/1924 | ............. B62K 3/002 |
| GB | | 2210592 A * | 6/1989 | ............. B62B 13/18 |
| KR | 20100123568 A * | | 11/2010 | ............. B62M 6/55 |
| WO | 2016044747 | | 3/2016 | |
| WO | WO-2018013069 A1 * | | 1/2018 | ............. B60P 1/48 |

* cited by examiner

MULTI-VEHICLE TYPE DEVICE HAVING BATTERY PACKS

BACKGROUND

Personal transportation vehicles are known to allow users to transport themselves from one location to another by using power from a battery, combustion engine, or under the user's own power. Battery powered personal transportation vehicles ("electric vehicles") are known to include one or more wheels, a platform for a user to stand or sit on, an electric motor for rotating the one or more wheels, and a battery to provide power to the electric motor. The battery is often rechargeable, and is typically inaccessible to a user by being sealed by the manufacturer inside a compartment mounted on a frame of the vehicle. When depleted of power, the battery can be recharged by connecting the battery to a power source, typically by inserting an electric plug in an electric port on the vehicle.

The battery is specifically designed for powering only the particular electric vehicle to which it is associated, and cannot be used for any other purpose. Moreover, once the battery no longer maintains a charge, the vehicle may be useless, or may require a costly new battery exchange and installation by the manufacturer.

BRIEF DESCRIPTION

According to one aspect, a universal electric vehicle frame is configured to be exchangeably coupled to a plurality of different types of sets of wheel assemblies to selectively form a plurality of different types of electric vehicles including an electric scooter, an electric skateboard, and an electric bicycle. The universal electric vehicle frame comprises an encasement including an opening through which a battery to power the electric vehicles can be inserted into an interior of the encasement, a first electrical connector in the interior for making an electrical connection with the battery, a first recess at a first end of the encasement, a second recess at a second end of the encasement, and a second electrical connector configured to make an electrical connection with an electric motor of an electric vehicle and electrically connected to the first electrical connector for providing power from the battery to the electric motor. The frame also includes first and second wheel assembly fasteners arranged at the first end of the encasement, and third and fourth wheel assembly fasteners arranged at the second end of the encasement. The first and second wheel assembly fasteners are configured to make a mechanical attachment to a first wheel assembly of the electric vehicle when a first body of the first wheel assembly is arranged in the first recess. The third and fourth wheel assembly fasteners are configured to make a mechanical attachment to a second wheel assembly of the electric vehicle when a second body of the second wheel assembly is arranged in the second recess.

According to another aspect, an electric vehicle comprises a universal electric vehicle frame and a set of wheel assemblies selected from the group consisting of a set of scooter wheel assemblies, a set of skateboard wheel assemblies, and a set of bicycle wheel assemblies. The frame comprises an encasement including an opening through which a plurality of batteries for powering the electric vehicle can be inserted into an interior of the encasement, a first electrical connector in the interior for making an electrical connection with the batteries, and a second electrical connector electrically connected to the first electrical connector. The frame also includes first and second wheel assembly fasteners arranged at a first end of the encasement, and third and fourth wheel assembly fasteners arranged at a second end of the encasement. The set of wheel assemblies includes a first wheel assembly fastened to the frame via the first and second wheel assembly fasteners, a second wheel assembly fastened to the frame via the third and fourth wheel assembly fasteners, and an electric motor connected to the second electrical connector, and configured to turn at least one wheel of at least one of the first and second wheel assemblies when supplied with power from the batteries. The frame is configured to be exchangeably coupled to the set of scooter wheel assemblies to form an electric scooter, the set of skateboard wheel assemblies to form an electric skateboard, and the set of bicycle wheel assemblies to form an electric bicycle.

DETAILED DESCRIPTION

Figure 1:
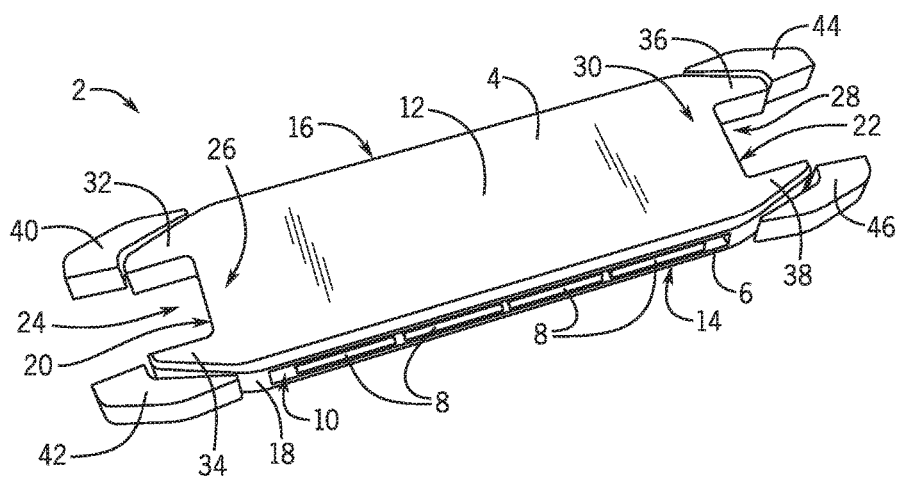
FIG. 1 is a perspective view of a universal electric vehicle frame including batteries according to the present subject matter.
Figure 2:
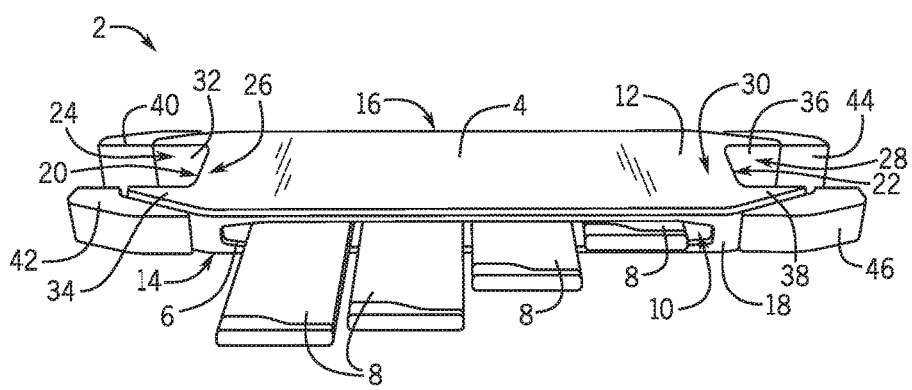
FIG. 2 is a perspective view of the frame of FIG. 1, showing the batteries partially removed from the frame.

Referring to the figures, and in particular FIGS. 1 and 2, there is shown a universal electric vehicle frame 2 that can be used as an integral frame member extending between and connecting various types of sets of two wheel assemblies to form various types of electric vehicles.

The frame 2 includes an encasement 4, which includes a first major (upper) face 12, a second major (lower) face 14, a first (right) side face 16, a second (left) side face 18, and first end (front) face 20, and a second end (rear) face 22. The terms "upper," "lower," "right," "left," "front," and "rear," are only used for convenience, and to distinguish between the different faces of the frame 2 in relation to the depictions of the frame 2 in the figures. It will be appreciated, that the frame 2 and the faces 12, 14, 16, 18, 20, and 22 can assume different orientations than those depicted.

As depicted, the encasement 4 is a general cuboid shape with each face 12, 14, 16, 18, 20, and 22 of the cuboid being a generally rectangle shape. However, the encasement 4 is not limited to this particular cuboid shape, and can comprise other shapes or arrangements as desired.

The encasement 4 includes an opening 6. As depicted in FIGS. 1 and 2, the opening 6 is included in the left side face 18. However, the location of the opening 6 is not particularly limited, and can be included in one of the other faces 12, 14, 16, 20, 22 of the encasement 4, such as the right side face 16. The opening 6 is configured such that one or more batteries 8 can be inserted into an interior 10 of the encasement 4. As best depicted in FIG. 2, the opening 6 is sized such that a) each of the batteries 8 is accessible from an exterior of the encasement 4 without moving any of the other batteries 8 that may be in the interior of the encasement 4; b) each of the batteries 8 can be separately inserted in, or removed from, the interior 10 of the encasement 4 without moving any of the other batteries 8 that may be in the interior of the encasement 4; and c) each of the batteries 8 can be simultaneously inserted in, or removed from, the interior 10 of the encasement 4.

The batteries 8 are inserted into the interior 10 of the encasement 4 so that the batteries 8 can be electrically connected to a first electrical connector (not shown) arranged in the interior 10 of the encasement 4. The first electrical connector is included in the interior 10 for making an electrical connection with the batteries 8 when they are inserted into the interior 10 in order to draw electric power from the batteries 8. In one embodiment, when the batteries 8 are electrically connected to the first electrical connector, the batteries 8 are arranged entirely within the interior 10 of the encasement 4 as depicted in FIG. 1. The batteries 8 may be selectively secured inside the encasement 4 so that they do not inadvertently fall out of the encasement 4 or become disconnected from the first electrical connector.

The encasement 4 also includes a second electrical connector (not shown) configured to make an electrical connection with an electric motor of one or more of the wheel assemblies. The first and second electrical connectors are electrically connected to each other so that the electric motor can draw electrical power from the one or more batteries 8 to power the electric motor.

The encasement 4 includes a first recess 24 at a first end 26 (e.g. front end) of the encasement 4, and a second recess 28 at a second end 30 (e.g. rear end) of the encasement 4. The first and second recesses 24, 28 are depicted to be arranged at opposite ends (first end 26 and second end 30) of the encasement 4, although this is not required, and alternatively the first and second recesses 24, 28 can be arranged at different locations on the encasement 4 as desired for a particular purpose or for a particular electrical vehicle configuration. As best depicted in FIG. 1, in one non-limiting embodiment, the encasement 4 includes a first arm 32 and a second arm 34 extending from the first end 26 of the encasement 4 and spaced apart to thereby define the first recess 24; and a third arm 36 and a fourth arm 38 extending from the second end 30 of the encasement 4 and spaced apart to thereby define the second recess 28.

The frame 2 may also include a first wheel assembly fastener 40, a second wheel assembly fastener 42, a third wheel assembly fastener 44, and a fourth wheel assembly fastener 46. The first and second wheel assembly fasteners 40, 42 may be arranged at the first end 26 of the encasement 4 and configured to operate in conjunction with each other for fastening a first wheel assembly to the frame 2. The third and fourth wheel assembly fasteners 44, 46 may be arranged at the second end 30 of the encasement 4 and operated in conjunction with each other for fastening a second wheel assembly to the frame 2. The wheel assembly fasteners 40, 42, 44, 46, may either be separate structures from the encasement 4 that are attached to the encasement 4, or may be integral to the encasement 4, such as being formed as a single structure with the encasement 4.

In one non-limiting embodiment as shown in the figures, the first wheel assembly fastener 40 is mounted on one side (e.g. right side) of the first recess 24, the second wheel assembly fastener 42 is mounted on another opposite side (e.g. left side) of the first recess 24, the third wheel assembly fastener 44 is mounted on the one side of the second recess 28, and the fourth wheel assembly fastener 46 is mounted on the other opposite side of the second recess 28. In one aspect, the first wheel assembly fastener 40 is mounted to the first arm 32, the second wheel assembly fastener 42 is mounted to the second arm 34, the third wheel assembly fastener 44 is mounted to the third arm 36, and the fourth wheel assembly fastener 46 is mounted to the fourth arm 38.

The present subject matter is not limited to any particular fastening mechanisms being utilized by the wheel assembly fasteners 40, 42, 44, 46 for attaching wheel assemblies to the frame 2. In one embodiment, the fasteners 40, 42, 44, 46 provide a mechanical attachment to the wheel assembly. By "mechanical attachment," it is meant a joining of two parts using only mechanical forces to hold the parts together, and relying on the physical interference of one part with the other to resist unwanted movement or motion. Various mechanical fastening mechanisms can be used as desired, including screw-type, clip-type, spring-type, compression-type, friction-type, pin-type, and other types of connections being made between the wheel assembly fasteners 40, 42, 44, 46 and the wheel assemblies.

As depicted in the figures, the encasement 4 is configured to accept four batteries 8, which are inserted into the interior 10 of the encasement 4 for connecting with the first electrical connector. However, the present subject matter is not limited to an encasement 4 that accepts four batteries. Instead, the present subject matter can include an encasement 4 that accepts more or less batteries, including 1, 2, 3, or 5 or more batteries. Moreover, although the depicted encasement 4 accepts four batteries 8 for powering an electric motor of an electric vehicle, it is envisioned that less than four (e.g. three, two, or even one) batteries can be used to power the electric motor. However, the electric motor may be able to provide a higher top speed, greater acceleration, more run time, or a combination thereof for the electric vehicle when more batteries are used compared to less batteries being used.

The batteries 8 are modular batteries, in that they are all identical to each other (i.e. identical dimensions and an identical power capacity) and each can be arranged in the interior 10 of the encasement 4 in any order or position and still be connected to the first electrical connector.

The batteries 8 may be primary batteries (not rechargeable) or secondary batteries (rechargeable). In several embodiments, the batteries 8 are rechargeable. The batteries 8 may be recharged using a wire to connect the batteries 8 with a power source (e.g. wall outlet, vehicle power source, or other electrical outlet), or wirelessly with an induction coil.

Recharging may be accomplished by arranging the batteries 8, frame 2, or the electric vehicle in an electrical charging docking station and electrically connecting the batteries 8 to a power source. In charging the batteries 8 using a wire connection, the batteries 8 may be charged when connected to the first electrical connection while they are in the interior 10 of the encasement 4. This may be accomplished by connecting the second electrical connection (which is electrically connected to the batteries 8 via the first electrical connection) to a power source using a wire. In an alternate embodiment, the batteries 8 may be removed from the encasement 4 and disconnected from the first electrical connections, and then charged by directly connecting the batteries 8 to a power source using a wire, for example by using a wire with a USB adapter that can be inserted into a USB port on each of the batteries 8. This may be accomplished for example, in a charging station, where one or more batteries can be arranged and recharged at the same time.

Figure 9:
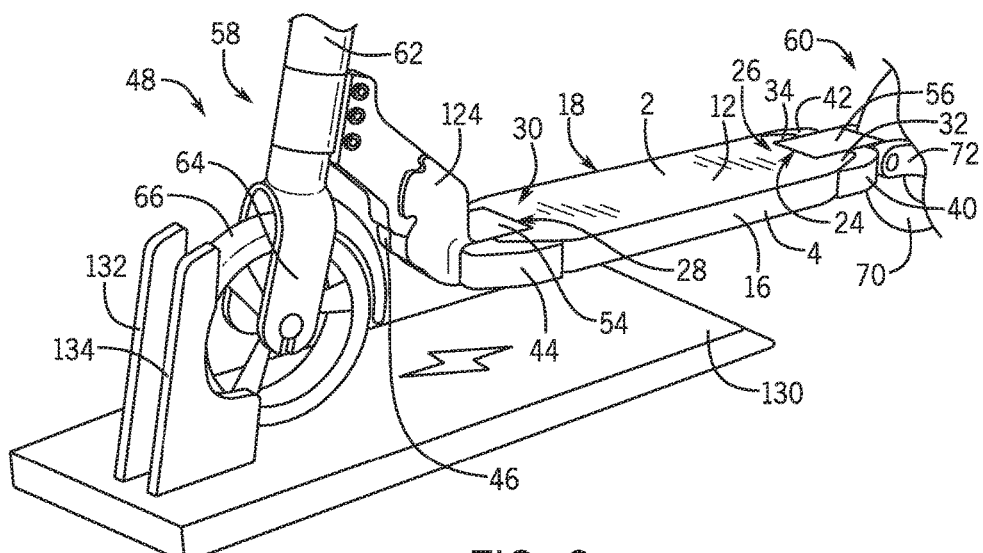
FIG. 9 is a perspective view of an electric scooter during wireless recharging in accordance with the present subject matter.

In charging the batteries 8 wirelessly, an induction coil may be included in a wireless charging pad that that draws power from an electrical outlet or other power source, for example, the pad may be arranged in an automobile and connected to the vehicle power source for charging the batteries 8 in the automobile. In one embodiment as depicted in FIG. 9, the electric vehicle (i.e. electric scooter 48) may be brought into proximity with a wireless induction charging pad 130 and charged wirelessly when an induction coil in the pad 130 creates an alternating electromagnetic field that impinges upon the batteries 8 in the frame 2. As depicted, the pad 130 may include two brackets 132, 134 that are used to stabilize the electric vehicle during charging.

Figure 10:
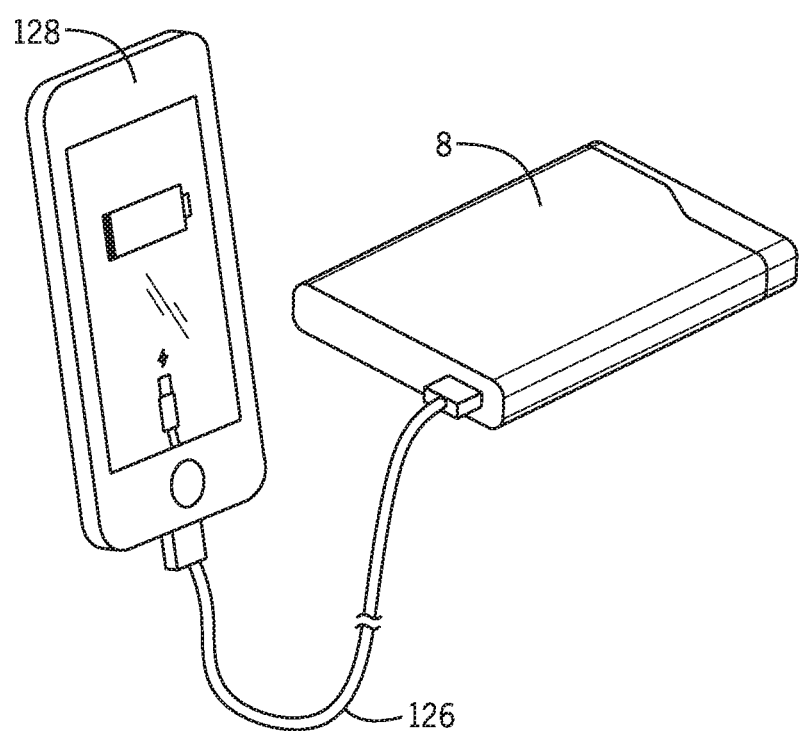
FIG. 10 is a perspective view of a battery being used to charge an electronic device in accordance with the present subject matter.

With reference to FIG. 10, the batteries 8 may each include a USB port, which can be used to connect to a wire 126 for either charging the battery 8, or for drawing power from the battery 8 to charge an electronic device 128. The USB port may also be used to electrically connect the battery 8 to the first electrical connector.

In accordance with the present subject matter, the frame 2 is selectively connected to a set of wheel assemblies to form an electric vehicle. The frame 2 is a universal frame, wherein the frame 2 is configured to be exchangeably coupled to one of a plurality of different types of sets of wheel assemblies to selectively form a plurality of different types of electric vehicles, which includes an electric scooter 48, an electric skateboard 50, and an electric bicycle 52.

The sets of wheel assemblies each include a first wheel assembly fastened to the frame 2 via the first and second wheel assembly fasteners 40, 42, a second wheel assembly fastened to the frame 2 via the third and fourth wheel assembly fasteners 44, 46, and an electric motor (not shown) connected to the second electrical connector, and configured to turn at least one wheel of at least one of the first and second wheel assemblies when supplied with power from the batteries 8. The electric motor is connected to the second electrical connector for drawing power from the batteries 8 to operate the electric motor to turn the wheels and propel the vehicle. The electric motor may be arranged on at least one of the first and second wheel assemblies.

The first wheel assembly includes at least one first wheel, and a first body 54 that is arranged at least partially within the first recess 24 and removably connected to the frame 2 via the first and second wheel assembly fasteners 40, 42. The second wheel assembly includes at least one second wheel, and a second body 56 that is arranged at least partially within the second recess 28 and removably connected to the frame 2 via the third and fourth wheel assembly fasteners 44, 46. The second electrical connector on the frame 2 may be arranged adjacent to the first recess 24, the second recess 28, or may include two electrical ports with one port located at each of the first and second recesses 24, 28 for making an electrical connection with the electrical motor associated with at least one of the first and second wheel assemblies. In this respect, at least one of the first body 54 and the second body 56 may include an electrical coupling (not shown) to electrically connect to the second electrical connector when at least one of the first and second bodies 54, 56 are arranged in the recesses 24, 28.

The plurality of different types of sets of wheel assemblies includes a set of scooter wheel assemblies, a set of skateboard wheel assemblies, and a set of bicycle wheel assemblies. The frame 2 is configured to be exchangeably coupled to the set of scooter wheel assemblies to form the electric scooter 48, the set of skateboard wheel assemblies to form the electric skateboard 50, and the set of bicycle wheel assemblies to form an electric bicycle 52.

Figure 3:
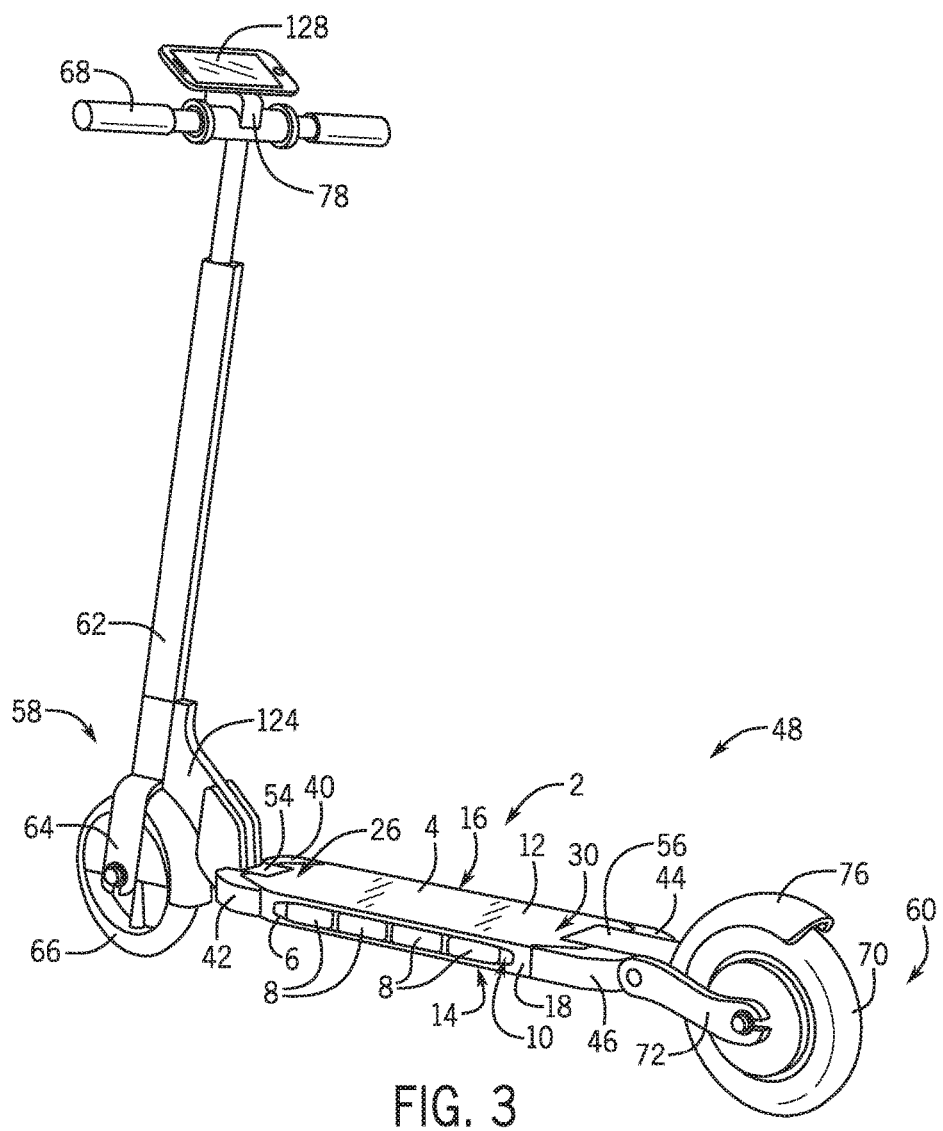
FIG. 3 is a perspective view of an electric scooter in accordance with the present subject matter.
Figure 4:
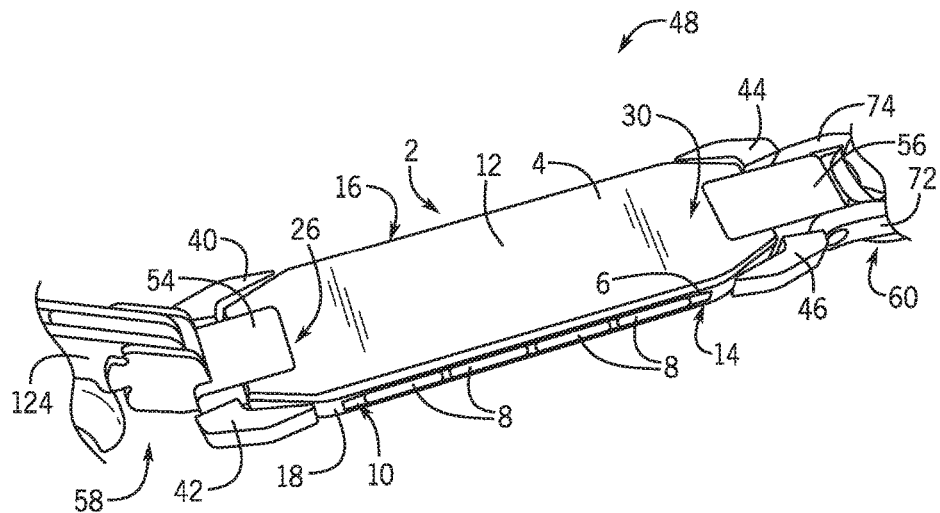
FIG. 4 is a partial perspective view of the electric scooter of FIG. 3.

In one embodiment, as depicted in FIGS. 3, 4, and 9, the electric vehicle is an electric scooter 48. The electric scooter 48 may also be known as a "kick scooter" as depicted, which includes a handlebar (including a scooter steering handle 68), a deck for standing on (provided by the encasement 4), and wheels (including a front scooter wheel assembly 58 and rear scooter wheel assembly 60). The set of wheel assemblies includes a set of scooter wheel assemblies comprising the front scooter wheel assembly 58 and the rear scooter wheel assembly 60, wherein the first wheel assembly is the front scooter wheel assembly 58 and the second wheel assembly is the rear scooter wheel assembly 60. The front scooter wheel assembly 58 includes a scooter steering stem 62 rotatably connected to the first body 54 by a collar 124, a scooter fork 64 attached to the scooter steering stem 62 and to a front scooter wheel 66, and the scooter steering handle 68 attached to the scooter steering stem 62. The rear scooter wheel assembly 60 includes a rear scooter wheel 70, one or more rods 72, 74 connecting the rear scooter wheel 70 to the second body 56, and a brake 76 for applying a braking friction to the rear scooter wheel 70. As depicted, the upper face 12 of the encasement 4 provides a platform for a user to stand on while riding the electric scooter 48. However, it will be appreciated that the encasement 4 may be oriented differently such that the lower face 14 is facing up and providing the platform on which a user can stand.

In one non-limiting embodiment, the first recess 24 and the second recess 28 may be identical, and the set of the first and second wheel assembly fasteners 40, 42 may be identical to the set of the third and fourth wheel assembly fasteners 44, 46. In this way, it will be appreciated that the frame 2 can be configured in any orientation with respect to the first and second wheel assemblies. For example and with reference to FIG. 9, the first body 54 of front scooter wheel assembly 58 may be inserted in the second recess 28 at the second end 30 of the frame 2 (rather than in the first recess 24 at the first end 26 of the frame 2) and connected to the frame 2 using the third and fourth wheel assembly fasteners 44, 46. Likewise, the second body 56 of the rear scooter wheel assembly 60 may be inserted in the first recess 24 at the first end 26 of the frame 2 (rather than in the second recess 28) and connected to the frame 2 using the first and second wheel assembly fasteners 40, 42. That is, the frame 2 can be oriented in either direction (i.e. it is reversible) with respect to the wheel assemblies of the electric vehicle.

In an alternate embodiment, the first and second recesses 24, 28 may be different from each other, and the set of the first and second wheel assembly fasteners 40, 42 may be different from the set of the third and fourth wheel assembly fasteners 44, 46. In this way, the first and second wheel assemblies may each be configured to be inserted into a specific recess and attached to a specific set of fasteners.

The scooter 48 may also include a holder 78 for holding an electronic device 128 on the scooter steering handle 68. The electric scooter 48 may be paired to the device 128 such that the scooter 48 may be locked by the device 128 until unlocked by subsequent communication with the electronic device 128 (such as by mounting the device 128 in the holder 78). One or more of the electric motor, batteries 8, scooter wheels 66, 70, or the frame 2 (such as by moving to a folded configuration) may be locked by the electronic device 128 to prevent use of the electric scooter 48.

Figure 5:
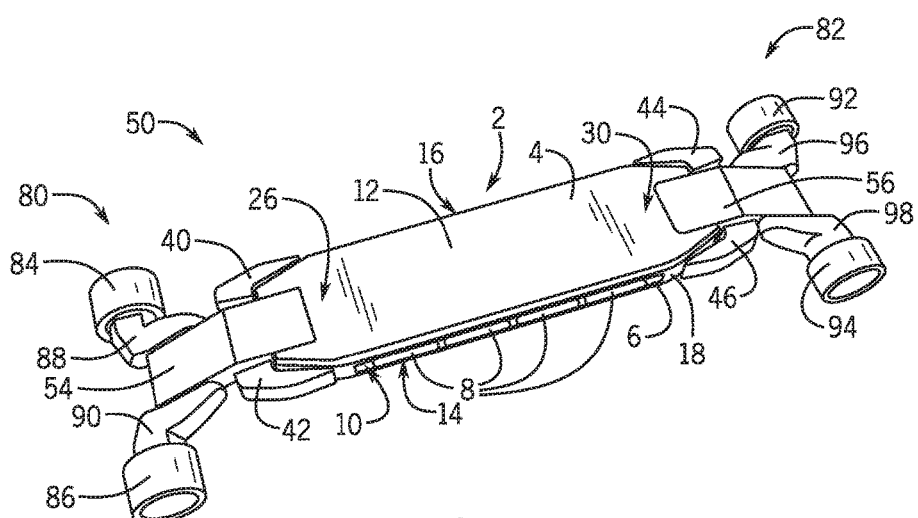
FIG. 5 is a perspective view of an electric skateboard in accordance with the present subject matter.
Figure 6:
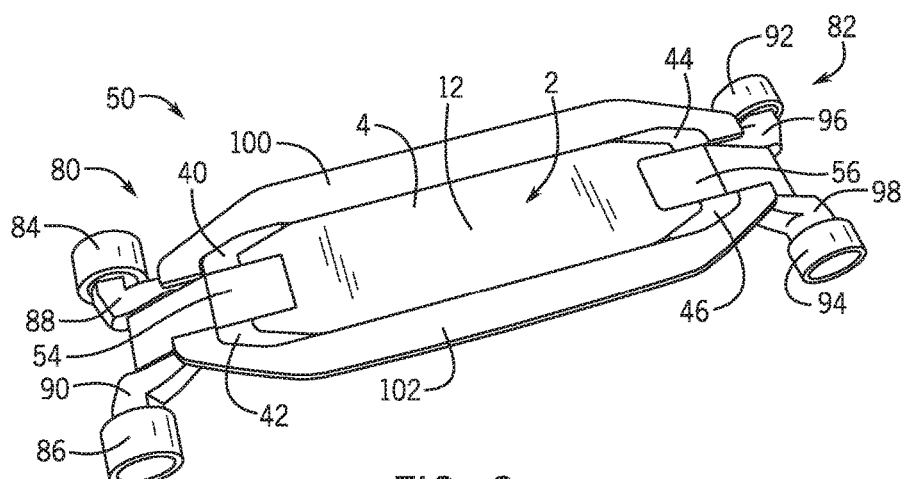
FIG. 6 is a perspective view of the electric skateboard of FIG. 5, further including extension platforms.

In another embodiment, as depicted in FIGS. 5 and 6, the electric vehicle is an electric skateboard 50. The set of wheel assemblies includes a set of skateboard wheel assemblies comprising a front skateboard wheel assembly 80 and a rear skateboard wheel assembly 82, wherein the first wheel assembly is the front skateboard wheel assembly 80 and the second wheel assembly is the rear skateboard wheel assembly 82. The front skateboard wheel assembly 80 includes a set of front skateboard wheels 84, 86 and front legs 88, 90 connecting the front skateboard wheels 84, 86 to the first body 54. The rear skateboard wheel assembly 82 includes a set of rear skateboard wheels 92, 94 and rear legs 96, 98 connecting the rear skateboard wheels 92, 94 to the second body 56. The electric skateboard 50 can further include extension platforms 100, 102 arranged on either side of the frame 2 to provide more surface area upon which a used can stand on the electric skateboard 50. As depicted, the upper face 12 of the encasement 4 provides a platform for a user to stand on while riding the electric skateboard 50. However, it will be appreciated that the encasement 4 may be oriented differently such that the lower face 14 is facing up and providing the platform on which a user can stand.

Figure 7:
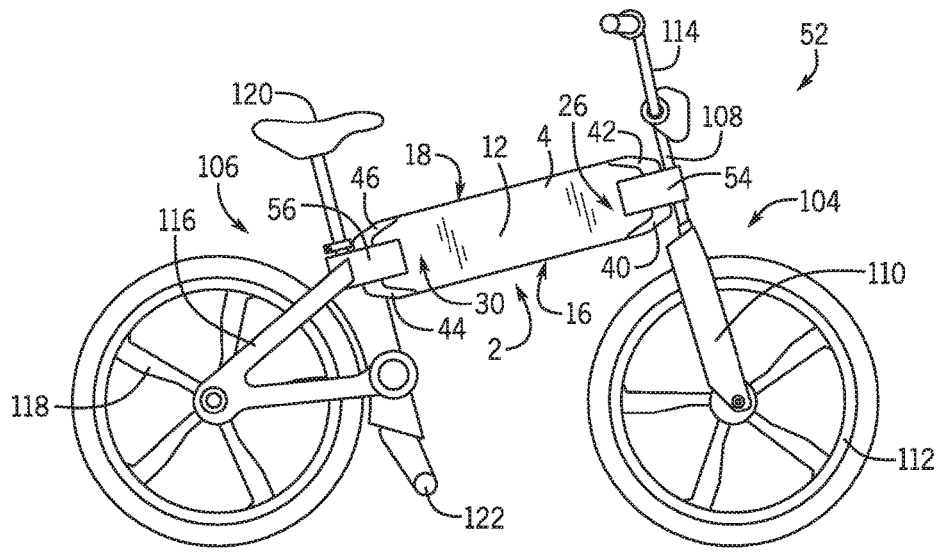
FIG. 7 is a perspective view of an electric bicycle in accordance with the present subject matter.
Figure 8:
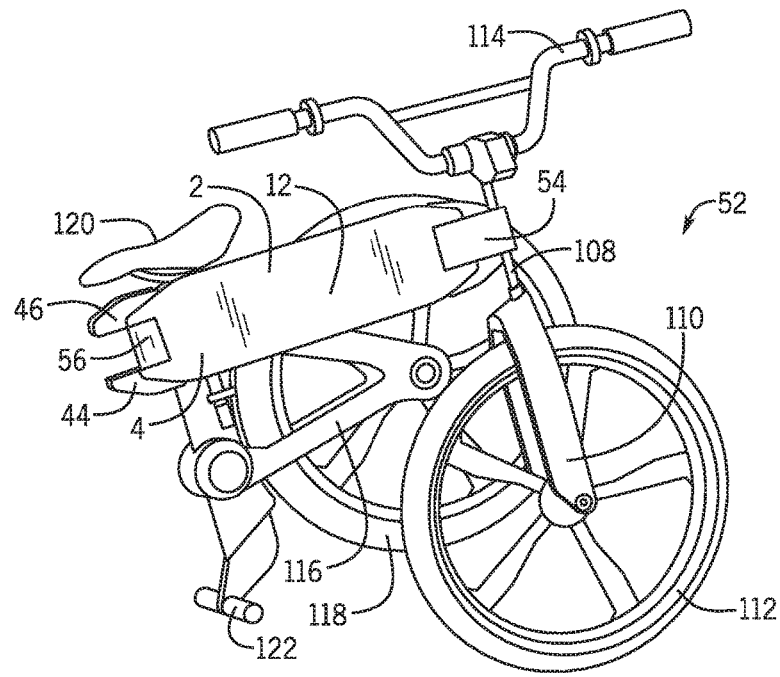
FIG. 8 is a perspective view of the electric bicycle of FIG. 7 in a folded configuration.

In still another embodiment, as depicted in FIGS. 7 and 8, the electric vehicle is an electric bicycle 52. The set of wheel assemblies includes a set of bicycle wheel assemblies comprising a front bicycle wheel assembly 104 and a rear bicycle wheel assembly 106, wherein the first wheel assembly is the front bicycle wheel assembly 104 and the second wheel assembly is the rear bicycle wheel assembly 106. The front bicycle wheel assembly 104 includes a bicycle steering stem 108 rotatably connected to the first body 54 and including a bicycle fork 110 attached to the bicycle steering stem 108 and to a front bicycle wheel 112, and a bicycle steering handle 114 attached to the bicycle steering stem 108. The rear bicycle wheel assembly 106 includes a rear frame 116 connecting a rear bicycle wheel 118 to the second body 56. The rear bicycle wheel assembly 106 also includes a seat 120 and a foot rest 122 for a user. As depicted, the frame 2 is oriented such that the left side face 18 is facing up in the FIG. 7. However, it will be appreciated that the encasement 4 may be oriented differently such that the right side face 16 is facing up.

In an alternative embodiment, the foot rest 122 may be replaced by pedals, a sprocket, and a chain connected to the rear bicycle wheel 118 so when the batteries 8 run out of power, a user can turn the rear bicycle wheel 118 using the pedals as is done on a conventional bicycle. The bicycle can also include other conventional bicycle features, such as hand or foot brakes.

In one embodiment, the rear bicycle wheel assembly 106 can be rotated at its junction with the frame 2 from an open configuration (FIG. 7), so that the electric bicycle 52 can assume a folded configuration (FIG. 8). This folded configuration as depicted in FIG. 8, may facilitate transporting the electric bicycle 52, for example, in an automobile, which can included an inductive or wired recharger to recharge the batteries 8 in the frame 2 while the electric bicycle 52 is being transported or stored in the automobile. The electric bicycle 52, like with the electric scooter 48, may be configured to be locked in this folded configuration. The electric bicycle 52 may be paired with an electronic device 128, which can be used to communicate with the electric bicycle 52 to unlock the electric bicycle 52 from the locked folded configuration.

In several embodiments, when first and second wheel assemblies are connected to the frame 2 (e.g. by using the wheel assembly fasteners 40, 42, 44, 46), the frame 2 is the only structural component extending between and connecting the first and second wheel assemblies. That is, no other frame members are supporting the first and second wheel assemblies other than the frame 2, which is the only structural component that structurally connects the first and second wheel assemblies to each other on the electric vehicle. In one aspect, the first and second wheel assemblies of the electric vehicle are not connected together, except by the frame 2.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A universal electric vehicle frame configured to be exchangeably coupled to a plurality of different types of sets of wheel assemblies including at least two of a set of scooter wheel assemblies, a set of skateboard wheel assemblies, and a set of bicycle wheel assemblies, so as to selectively form a plurality of different types of electric vehicles including at least two of an electric scooter, an electric skateboard, and an electric bicycle, respectively, the universal electric vehicle frame comprising:
   an encasement including
      an opening through which a battery to power the electric vehicles can be inserted into an interior of the encasement,
      a first electrical connector in the interior for making an electrical connection with the battery,
      a first recess at a first end of the encasement and a second recess at a second end of the encasement, and
      a second electrical connector configured to make an electrical connection with an electric motor of the electric vehicles, and electrically connected to the first electrical connector for providing power from the battery to the electric motor,
   first and second wheel assembly fasteners arranged at the first end of the encasement, and
   third and fourth wheel assembly fasteners arranged at the second end of the encasement,
   wherein the first and second wheel assembly fasteners are configured to make a mechanical attachment to a first wheel assembly of the electric vehicles when a first body of the first wheel assembly is arranged in the first recess,
   wherein the third and fourth wheel assembly fasteners are configured to make a mechanical attachment to a second wheel assembly of the electric vehicles when a second body of the second wheel assembly is arranged in the second recess.

2. The universal electric vehicle frame according to claim 1, further including the battery electrically connected to the first electrical connector.

3. The universal electric vehicle frame according to claim 2, wherein the battery is housed completely within the interior of the encasement when electrically connected to the first electrical connector.

4. The universal electric vehicle frame according to claim 2, wherein the battery includes a plurality of identical modular batteries.

5. The universal electric vehicle frame according to claim 4, wherein the batteries are rechargeable batteries that can be recharged when arranged in the interior of the encasement and electrically connected to the first electrical connector, or when arranged outside the encasement and disconnected from the first electrical connector.

6. The universal electric vehicle frame according to claim 1, wherein:
the encasement includes first, second, third, and fourth arms,
the first and second arms each extend from the first end of the encasement and are spaced apart to thereby define the first recess,
the third and fourth arms each extend from the second end of the encasement and are spaced apart to thereby define the second recess.

7. The universal electric vehicle frame according to claim 6, wherein:
the first wheel assembly fastener is arranged on the first arm,
the second wheel assembly fastener is arranged on the second arm,
the third wheel assembly fastener is arranged on the third arm, and
the fourth wheel assembly fastener is arranged on the fourth arm.

8. The universal electric vehicle frame according to claim 1, wherein:
the first recess is identical to the second recess, and
the first and second fasteners are identical to the third and fourth fasteners.

9. An electric vehicle comprising a universal electric vehicle frame and a set of wheel assemblies including a set of scooter wheel assemblies, a set of skateboard wheel assemblies, and a set of bicycle wheel assemblies,
the frame comprising
an encasement including
an opening through which a plurality of batteries for powering the electric vehicle can be inserted into an interior of the encasement,
a first electrical connector in the interior for making an electrical connection with the batteries, and
a second electrical connector electrically connected to the first electrical connector,
first and second wheel assembly fasteners arranged at a first end of the encasement,
third and fourth wheel assembly fasteners arranged at a second end of the encasement,
the set of wheel assemblies including
a first wheel assembly fastened to the frame via the first and second wheel assembly fasteners,
a second wheel assembly fastened to the frame via the third and fourth wheel assembly fasteners,
an electric motor connected to the second electrical connector, and configured to turn at least one wheel of at least one of the first and second wheel assemblies when supplied with power from the batteries,
wherein the frame is configured to be exchangeably coupled to the set of scooter wheel assemblies to form an electric scooter, the set of skateboard wheel assemblies to form an electric skateboard, and the set of bicycle wheel assemblies to form an electric bicycle.

10. The electric vehicle according to claim 9, further comprising a plurality of modular batteries configured to be electrically connected to the first electrical connector for providing power to the electric motor.

11. The electric vehicle according to claim 10, wherein:
when the batteries are electrically connected to the first electrical connector the batteries are arranged entirely within the interior of the encasement, and
the opening in the encasement is sized, such that
a) each of the batteries are accessible from an exterior of the encasement without moving any of the other batteries that may be in the interior of the encasement,
b) each of the batteries can be separately inserted in, or removed from, the interior of the encasement without moving any of the other batteries that may be in the interior of the encasement, and
c) the batteries can be simultaneously inserted in, or removed from, the interior of the encasement.

12. The electric vehicle according to claim 10, wherein the batteries are rechargeable batteries that can be recharged when arranged in the interior of the encasement and electrically connected to the first electrical connector, or when arranged outside the encasement and disconnected from the first electrical connector.

13. The electric vehicle according to claim 12, further including a wireless induction charging pad, wherein the rechargeable batteries are configured to be wirelessly recharged when in proximity to the induction charging pad.

14. The electric vehicle according to claim 10, wherein the batteries each include a USB port.

15. The electric vehicle according to claim 9, wherein:
a first recess is arranged at the first end of the encasement and a second recess is arranged at the second end of the encasement,
the first wheel assembly includes at least one first wheel, and a first body that is arranged at least partially within the first recess and removably connected to the frame via the first and second wheel assembly fasteners,
the second wheel assembly includes at least one second wheel, and a second body that is arranged at least partially within the second recess and removably connected to the frame via the third and fourth wheel assembly fasteners.

16. The electric vehicle according to claim 15, wherein:
the electric vehicle is the electric scooter,
the set of wheel assemblies is the set of scooter wheel assemblies,
the first wheel assembly is a front scooter wheel assembly,
the at least one first wheel includes a front scooter wheel,
the front scooter wheel assembly further including a scooter steering stem rotatably connected to the first body and including a scooter fork attached to the scooter steering stem and to the front scooter wheel, and a scooter steering handle attached to the scooter steering stem,
the second wheel assembly is a rear scooter wheel assembly,
the at least one second wheel includes a rear scooter wheel, and
the rear scooter wheel assembly further including one or more rods connecting the rear scooter wheel to the second body, and a brake for applying a braking friction to the rear scooter wheel.

17. The electric vehicle according to claim 15, wherein:
the electric vehicle is the electric skateboard,
the set of wheel assemblies is the set of skateboard wheel assemblies,
the first wheel assembly is a front skateboard wheel assembly,
the at least one first wheel is a set of front skateboard wheels, the front skateboard wheel assembly further including one or more front legs connecting the front skateboard wheels to the first body, the second wheel assembly is a rear skateboard wheel assembly, the at least one second wheel is a set of rear skateboard wheels, and the rear skateboard wheel assembly further including one or more rear legs connecting the rear skateboard wheels to the second body.

18. The electric vehicle according to claim 17, further including two extension platforms arranged on either side of the frame.

19. The electric vehicle according to claim 15, wherein:

the electric vehicle is the electric bicycle, the set of wheel assemblies is the set of bicycle wheel assemblies, the first wheel assembly is a front bicycle wheel assembly, the at least one first wheel is a front bicycle wheel, the front bicycle wheel assembly further including a bicycle steering stem rotatably connected to the first body, and including a bicycle fork attached to the bicycle steering stem and to the front bicycle wheel and a bicycle steering handle attached to the bicycle steering stem, the second wheel assembly is a rear bicycle wheel assembly, the at least one second wheel is a set of rear bicycle wheel, and the rear bicycle wheel assembly further including a rear frame connected to the second body and having the rear bicycle wheel rotatably mounted thereon, a seat connected to the rear frame, and a foot rest connected to the rear frame.

20. The electric vehicle according to claim 19, wherein the rear frame is rotatably mounted to the second body and the electric bicycle is configured to be selectively moved between an open configuration and a folded configuration.

* * * * *